United States Patent [19]

Mizutani et al.

[11] Patent Number: 4,801,652
[45] Date of Patent: Jan. 31, 1989

[54] HEAT SHRINKABLE FILM

[75] Inventors: Tomoji Mizutani; Hideo Isozaki, both of Yatsushiro; Makoto Hirata, Sencho; Hitoshi Fukushima, Yatsushiro, all of Japan

[73] Assignee: Kohjin Co., Ltd., Tokyo, Japan

[21] Appl. No.: 20,980

[22] Filed: Mar. 2, 1987

[30] Foreign Application Priority Data

Mar. 3, 1986 [JP] Japan ................... 61-44169
Mar. 3, 1986 [JP] Japan ................... 61-44170
May 15, 1986 [JP] Japan ................... 61-109436

[51] Int. Cl.$^4$ ................. C08L 23/08; C08L 23/18
[52] U.S. Cl. .................. 525/240; 526/348.1; 524/528
[58] Field of Search ........................ 525/240

[56] References Cited

U.S. PATENT DOCUMENTS

| | | | |
|---|---|---|---|
| 4,354,997 | 10/1982 | Mizutani et al. | 264/560 |
| 4,413,097 | 11/1983 | Matsuura et al. | 625/240 |
| 4,429,079 | 1/1984 | Shibata et al. | 525/240 |
| 4,463,153 | 7/1984 | Mizutani et al. | 526/348.1 |
| 4,597,920 | 7/1986 | Golike | 264/22 |

FOREIGN PATENT DOCUMENTS 58-038738 3/1983 Japan .
58-222131A 12/1983 Japan .

OTHER PUBLICATIONS

Mitsui–Abstract of Japanese 52039-741-(3-77).
Showa Denko–Abstract of Japanese 57059-943 (4–82).

Primary Examiner—Carman J. Seccuro
Attorney, Agent, or Firm—Armstrong, Nikaido, Marmelstein & Kubovcik

[57] ABSTRACT

A biaxially stretched film of an ethylene copolymer, preferably a mixture of (A) 90 to 50% by weight of a linear ethylene-α-olefin copolymer having a density of 0.90 to 0.93 g/cm$^3$ at 25° C. and a melt index of 0.2 to 3.0 g/10 min. and (B) 10 to 50% by weight of an ethylene polymer having a density of 0.87 to 0.91 g/cm$^3$ at 25° C. and less than the density of the copolymer (A) by at least 0.014 g/cm$^3$ and a melt index of 0.2 to 5.0 g/10 min., said copolymer or copolymer mixture giving a DSC curve with an endothermic area under the temperature lower than its melting temperature (main endothermic peak temperature) by 10° C. accounting for at leat 55% of the total endothermic area. The stretched film is little varying in thickness and is excellent in heat shrinkability at low temperature.

3 Claims, 1 Drawing Sheet

HEAT SHRINKABLE FILM

BACKGROUND OF THE INVENTION

The present invention relates to a shrink packaging material. More particularly, the present invention relates to a plastic packaging film prepared from a defined ethylene-α-olefin copolymer as a main component, which is excellent in heat shrinkability at relatively low temperature and little varying in thickness.

Heretofore known are such heat shrinkable films as polyvinyl chloride film, biaxially stretched polypropylene film, polyethylene film and so on. Among these films, polyethylene film is manufactured by the so-called inflation method in which a tubular film is extruded from a circular die and directly blown-up under gas pressure. This film, because of low production cost, high strength at the heat sealing joint and other advantages, has been widely used in shrink-wrapping applications.

The heat shrinkable polyethylene film produced by the inflation method, because of the very nature of the film-forming technique involved, has not been subjected to effective molecular orientation so that the film is inadequate in strength, high in elongation and shows a high rate of shrinkage only at high temperatures close to its melting point, thus being not fully satisfactory in such various properties as required for shrink packaging film.

The so-called irradiated polyethylene film which has been offered as an improvement over the above film in regard to the disadvantages just mentioned is a film which is obtainable by irradiating a polyethylene film with ionizing radiation so as to induce intermolecular crosslinking and, then, stretching the same. This irradiated polyethylene film has effects due to molecular orientation caused by stretching, showing increased strength and decreased elongation, for instance, but is disadvantageous in that it has a poor heat sealability, does not permit the reclamation and reuse of scraps, and is costly because of the radiation treatment required.

For the purpose of overcoming these disadvantages, the present inventors conducted a detailed study of the heat shrinkable polyethylene film from technical as well as material points of view and previously invented a heat shrinkable polyethylene film with improved heat shrinkability by orientation while retaining the desirable properties of polyethylene film such as good heat sealability and high impact resistance and a method for production of such heat shrinkable polyethylene film (U.S. Pat. No. 4,354,997 and No. 4,463,153).

Unlike the so-called inflation-molded film, the film obtainable in accordance with this prior invention develops the shrinkage and shrinkage stress necessary for shrink packaging even at a temperature below its melting point to establish an intimate contact with the object being packaged but the technique is not necessarily satisfactory in tube stability during stretching operation and in the uniformity of stretching result with a large variation in thickness. Moreover, the orientation effect induced by stretching is not fully realized so that the low-temperature heat shrinkability of the film is still inadequate. Therefore, when the object to be packaged is one, such as raw meat, that is liable to undergo degradation at a relatively low temperature region of about 85° to 90° C., intimate shrink packaging results cannot be attained with such film.

It is an object of the invention to provide a heat shrinkable polyethylene film which is little varying in thickness and has a good heat shrinkability at low temperature.

This and other objects of the invention will become apparent from the description hereinafter.

SUMMARY OF THE INVENTION

The present invention provides a heat shrinkable ethylene polymer film having an area heat shrinkage of at least 20% at 90° C. and a thickness variation of not more than 20%, said heat shrinkable ethylene polymer film being a biaxially stretched film of an ethylene polymer comprising at least one linear copolymer of ethylene and α-olefin in a stretching ratio of at least 2 in each of machine and transverse directions, said ethylene polymer indicating a differential scanning calorimetry (DSC) curve wherein an endothermic area below the temperature lower than the melting temperature (main endothermic peak temperature) of the ethylene polymer by 10° C. accounts for at least 55% of the total endothermic area.

The heat shrinkable ethylene polymer film is little varying in thickness and has an excellent heat shrinkability at low temperature.

In particular, when a mixture of (A) 90 to 50% by weight of at least one linear copolymer of ethylene and α-olefin having a density of 0.90 to 0.93 g/cm$^3$ at 25° C. and a melt index of 0.2 to 3.0 g/10 min. and (B) 10 to 50% by weight of at least one ethylene polymer having a density of 0.87 to 0.91 g/cm$^3$ at 25° C. and less than the density of the copolymer (A) by at least 0.014 g/cm$^3$ and a melt index of 0.2 to 5.0 g/10 min. is used as a starting material, a heat shrinkable film having a more excellent shrinkability at low temperature can be obtained. That is, a heat shrinkable film having having an area heat shrinkage of not less than 15% at 85° C., preferably a heat shrinkage of not less than 15% at 85° C. in each of machine and transverse directions is obtained.

DETAILED DESCRIPTION

Figure 1:
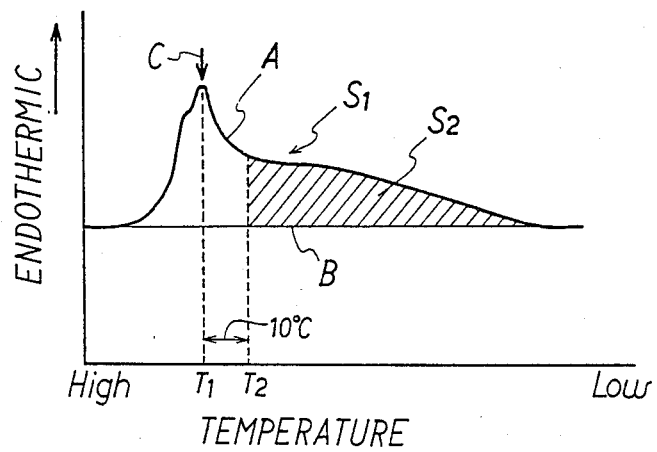
FIG. 1 is a schematic graph showing a differential scanning calorimetry curve of a polymer for explaining a manner of determining the endothermic area ratio defined above.

The polymer used in the present invention is the ethylene copolymer (A) mentioned below or a mixture of the copolymer (A) and the ethylene polymer (B) mentioned below.

The α-olefin which is copolymerized with ethylene for the production of the linear ethylene-α-olefin copolymer (A) to be used in the present invention is preferably α-olefins containing 4 to 18 carbon atoms, especially 4 to 8 carbon atoms. Examples of the α-olefin include butene-1, pentene-1, hexene-1, heptene-1, octene-1, 4-methylpentene-1, decene-1, undecene-1 and dodecene-1. The copolymerization reaction of these comonomers can be carried out by a low or medium pressure method using a Ziegler-Natta catalyst.

The α-olefin content in the copolymer (A) is preferably in the range of 0.5 to 20% by mole, particularly 0.5 to 10% by mole.

An ethylene-α-olefin copolymer having a density of 0.90 to 0.93 g/cm$^3$ at 25° C. and a melt index of 0.2 to 3.0 g/10 min is preferably employed as the copolymer (A).

Those copolymers (A) may be used alone or as an admixture thereof.

The above-mentioned mixture of (A) a linear copolymer of ethylene and α-olefin having a density of 0.90 to 0.93 g/cm$^3$ at 25° C. and a melt index of 0.2 to 3.0 g/10 min. and (B) an ethylene polymer having a density of 0.87 to 0.91 g/cm$^3$ at 25° C. and less than the density of the copolymer (A) by at least 0.014 g/cm$^3$ and a melt index of 0.2 to 5.0 g/10 min. gives a heat shrinkable film having a more excellent heat shrinkability at a low temperature such as 85° C.

When the difference in density between the copolymer (A) and the polymer (B) is less than 0.014 g/cm$^3$, the blend effect of both polymers is insufficient, which results in poor heat shrinkability at low temperature.

A copolymer of ethylene and α-olefin containing 4 to 12 carbon atoms, particularly 4 to 8 carbon atoms and which has an α-olefin content of 0.5 to 10% by mole is preferably employed as the copolymer (A) used in the mixture.

A copolymer of ethylene and α-olefin containing 4 to 8 carbon atoms and which has an α-olefin content of 5 to 20% by mole is preferably employed as the ethylene polymer (B).

The polymer mixture is preferably a mixture of 90 to 50% by weight of the copolymer (A) and 10 to 50% by weight of the polymer (B). The polymer mixture is melted and extruded into a film which is then biaxially stretched to give a heat shrinkable film with an especially desirable heat shrinkability at low temperature. When the proportion of the polymer (B) is less than 10% by weight, the resulting film is poor in heat shrinkability at low temperature. When the proportion of the polymer (B) is more than 50% by weight, the resulting film is marked in blocking property so that the wound film cannot be smoothly unwound, which results in a poor operation efficiency, and, in particular case, undesirable phenomena such as blocking occur on the film surface, which results in poor commercial value. Further, the resulting film is poor in toughness, which results in poor in handling property.

The copolymer or copolymer mixture used in the practice of the present invention must indicate a differential scanning calorimetry curve (hereinafter referred to as "DSC curve") wherein the endothermic area under the temperature lower than the melting temperature (main endothermic peak temperature) of the copolymer or copolymer mixture by 10° C. accounts for at least 55% of the total endothermic area.

The definitions of the above measurements are explained by referring to FIG. 1 which is a schematic graph showing a DSC curve of a copolymer or a copolymer mixture. In FIG. 1, the curve A is DSC curve and the straight line B is a base line. The main endothermic peak in DSC curve is indicated by the arrow C.

Melting temperature:

The melting temperature is expressed in terms of main endothermic peak temperature $T_1$ corresponding to the main endothermic peak C.

Total endothermic area:

The total endothermic area $S_1$ means the area of the portion which is surrounded by the DSC curve A and the base line B.

Endothermic area below the temperature lower than the melting temperature (main endothermic peak temperature) by 10° C. (hereinafter referred to as "endothermic area $S_2$"):

The endothermic area $S_2$ is the area of the shadowed portion in FIG. 1. That is, the endothermic area $S_2$ means the area of a portion which is surrounded by the DSC curve A and the base line B and exists on the low-temperature side with respect to the temperature $T_2$ lower than the melting temperature $T_1$ by 10° C.

With a copolymer or copolymer mixture not meeting the above condition, the uniformity of stretching is not easily obtained. For example, if the stretching temperature is increased in order to assure the uniformity of stretching, the stability of stretching is adversely affected and the orientation effect does not develop well so that the low-temperature heat shrinkability is not as satisfactory as desired. In the case that the above condition is satisfied, uniform and stable stretching is possible without the need to limit the stretching temperature within a narrow temperature gradient range but selecting a stretching temperature from within a comparatively broad range below the temperature lower than the melting temperature of the copolymer or copolymer mixture by 10° C. Moreover, it is also possible to achieve a high orientation effect due to stretching so that the invention provides a practically useful heat shrinkable film with an area heat shrinkage of 20% or more at 90° C., preferably an area heat shrinkage of 15% or more at 85° C., more preferably a heat shrinkage of 15% or more in each of machine and transverse directions at 85° C., and a thickness variation of not more than 20%.

For the above-mentioned determination with a differential scanning calorimeter, 6 to 8 mg of a sample was sealed in an aluminum pan, heated in a nitrogen stream up to 190° C. and held at this temperature for 1 hour. Thereafter, the temperature was reduced at a rate of about 10° C./min. down to room temperature and, then, a DSC curve was recorded at a temperature increasing rate of 10° C./min. with a sensitivity of 25 mg/sec.

Within the range not detrimental to the objects of the present invention, high pressure polyethylene, ethylene-vinyl acetate copoymer, ionomers, ethylene-propylene copolymer, etc. can also be incorporated into the above copolymer or copolymer mixture.

In addition, such additives as lubricating agents, antiblocking agents, antistatic agents and antifogging agents can, of course, be incorporated for exploiting the respective useful properties.

Furthermore, since blocking tends to occur when the average density of the copolymer or copolymer mixture approaches 0.90 or drops below the level, it is then preferable to incorporate about 2,000 to 5,000 ppm of an antiblocking agent such as finely divided silica powder or higher fatty acid amide.

The production and stretching of a material film for use in accordance with the present invention can be carried out in the per se known manner, and will be explained below in detail taking the production and stretching of tubular film as an example.

First, the above-specified copolymer or copolymer mixture is melted by heating, kneaded and extruded into a tube which is then solidified by rapidly cooling to give a material film which is a substantially non-stretched film.

Figure 2:
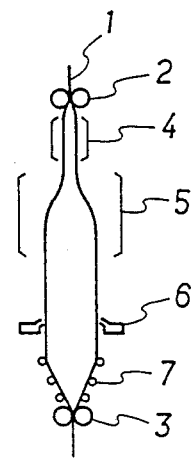
FIG. 2 is a schematic diagram showing a biaxial stretching apparatus used in the examples.

The tubular film thus obtained is fed to a tubular stretching equipment such as shown in FIG. 2, by which it is expanded and stretched and, at the same time, biaxially oriented in a temperature region where an effectively high degree of orientation is induced, for example, at a temperature lower than the melting temperature of the copolymer or copolymer mixture by 10° C. or more, preferably at a temperature lower than said melting temperature by 20° C. or more. The stretching ratio may not be the same for both machine and transverse directions but in order to assure satisfactory physical characteristics, it is desirable to use a stretching ratio of at least 2 and preferably at least 2.5 in each direction. The upper limit of the stretching ratio is usually 6 in each direction.

The film emerging from the stretching equipment can be annealed if necessary. This annealing helps control the spontaneous shrinkage of the film during storage.

The use of an ethylene polymer comprising at least one linear ethylene-α-olefin copolymer, the DSC curve of which shows that the endothermic area under the temperature lower than the melting temperature (main endothermic peak temperature) by 10° C. is at least 55% of the total endothermic area, permits stable stretching at a comparatively low temperature below the melting temperature of the ethylene polymer with the consequent decrease in film thickness variation and improvement in orientation effect, so that a superior heat shrinkable film with an excellent low-temperature heat shrinkability can be obtained stably.

Furthermore, the addition of an ultra-low density ethylene polymer with a density of not more than 0.910 g/cm³, which is not generally employed for the purpose, to the above-mentioned low density ethylene copolymer results in an excellent heat shrinkability even under lower temperature condition or moderate shrink conditions without losing other general physical properties required of packaging materials, so that the resulting film can be used satisfactorily for packaging products which cannot be heated to high temperatures.

The present invention is more specifically described and explained by means of the following Examples. It is to be understood that the present invention is not limited to the Examples, and various change and modifications may be made in the invention without departing from the spirit and scope thereof.

The quantitative data given in the examples were determined by the following methods.

1. Shrinkage

A square specimen, 10 cm by 10 cm, was cut out of each sample film and immersed in a glycerin bath maintained at a given temperature for 10 seconds and the percent shrinkage were calculated by means of the following equation.

$$\text{Shrinkage in the machine direction } (MD)(\%) = \frac{10 - A}{10} \times 100$$

Shrinkage in the transverse direction $(TD)(\%) =$ $$\frac{10 - B}{10} \times 100$$

Area shrinkage $(\%) = 100 - A \times B$ where A and B represent the lengths (in cm) in the machine and transverse directions, respectively, after immersion.

2. Thickness variation

Thickness of each tubular film in the circumferential direction thereof were recorded with a contact-type micrometer (Model K306C made by Anritsu Electric Co., Ltd.) at a full scale of 8 μm. From the obtained chart, the maximum thickness ($T_{max}$), minimum thickness ($T_{min}$), and average thickness (T) were determined. Then, thickness veriation (%) was calculated by means of the following equation.

$$\frac{T_{max} - T_{min}}{T} \times 100$$

wherein T represents the arithmetic mean of readings at the chart positions corresponding to the intervals of 10 mm on the film sample.

The α-olefin content (% by mole) of the copolymers used in Examples was obtained as follows. The degree of branching per 100 carbons contained in the main chain of the copolymer was determined by IR analysis with using the following equation:

Degree of branching $= 0.100 \, (K'_{1378} - 0.741 \, K'_{1303} - 2.6)$ $$\text{wherein } K' = \frac{1}{d \times L} \log \frac{I_0}{I},$$

d: the density of polymer,
L: the thickness of the sample,
$I_0$: the intensity of incident light,
I: the intensity of transmitted light, the values of $K'_{1378}$ and $K'_{1303}$ are values of K' obtained with respect to the absorption peak in the vicinity of 1378 cm$^{-1}$ and the absorption peak in the vicinity of 1303 cm$^{-1}$, respectively. The α-olefin content (% by mole) was obtained by multiplying the degree of branching by 2.

EXAMPLE 1

A mixture of 35 parts by weight of a linear low density polyethylene(ethylene-4-methylpentene-1 copolymer) with a melt index of 2.0 g/10 min., a density of 0.920 g/cm³ at 25° C. and a 4-methylpentene-1 content of 5% by mole, 35 parts by weight of a linear low density polyethylene(ethylene-butene-1 copolymer) with a melt index of 0.8 g/10 min., a density of 0.923 g/cm³ at 25° C. and a butene-1 content of 6% by mole and 30 parts by weight of an ultra-low density polyethylene(ethylene-butene-1 copolymer) with a melt index of 1.9 g/10 min., a density of 0.904 g/cm³ at 25° C. and a butene-1 content of 10% by mole was melted and kneaded at 200° to 250° C. and the melt was extruded in a downward direction from a circular die maintained at 250° C. The DSC curve of this polymer mixture showed that the main peak temperature was 120° C. and the endothermic area under 110° C. accounted for 60.7% of the total endothermic area. The slit diameter of the circular die was 75 mm and the slit gap was 0.8 mm. The molten tubular film thus extruded was cooled while guiding it over the outer surface of a cylindrical mandrel having an outer diameter of 66 mm as disposed just below the die and internally supplied with circulating cooling water at 20° C., with the exterior surface of the film being passed through a water bath, to thereby give a tubular unstretched film with a diameter of about 65 mm and a thickness of 190 μm.

This unstretched film as the material film was guided to the biaxial stretching device illustrated in FIG. 1, where the material film 1 was expanded and stretched. The voltage and current of the circular infrared heaters of the preheater 4 were adjusted so that the film temperature at the exit of the preheater was kept at 65° C.

The eight circular infrared heaters of the main heater 5 were grouped in 4 sections and the voltage and current of each section were adjusted. While an air stream was supplied along the outer surface of the tube from a cooling air ring 6 positioned below the main heater, a pressurized air was blown into the tubular film between low-speed nip rolls 2 and high-speed nip rolls 3. The pressure of the pressurized air and the relative peripheral speeds of the low-speed and high-speed nip rolls 2 and 3 were controlled so as to effect tubular stretching in a stretching ratio of 3 in each of the machine and transverse directions.

The thus stretched tubular film was collapsed through collapser rolls 7 and the nip rolls 3 and withdrawn in flattened form from the stretching apparatus and fed to a tubular annealing apparatus where the flattened film was again inflated with air and annealed for 10 seconds with a hot air blast at 75° C. from a heating cylinder had, then, cooled to room temperature through a cooling cylinder. The cooled film was collapsed again and taken up.

The resulting film and a thickness of 20.8 μm, a thickness variation of 12%, heat shrinkages of 16.7% and 18.0% in machine and transverse directions, respectively, at 85° C., and an area heat shrinkage of 31.7% at 85° C.

Using the above film, about 2 kg of raw broiler meat was pre-packaged. The pre-packaged product was passed through a commercially available tunnel heater for shrinking in which a hot air stream of 110° C. was available for about 5 seconds, whereupon the film was tightly wrapped around the meat. The broiler meat was not affected by this packaging process.

The seal portion and remaining portion of the package had sufficient strength, indicating that the packaging film of the present invention was excellent for practical purposes.

Various physical data inclusive of the above shrinkage data are shown in Table 1.

EXAMPLE 2

A mixture of 70 parts by weight of the same linear low density polyethylene(ethylene-4-methylpentene-1 copolymer) as used in Example 1 and 30 parts by weight of an ultra-low density polyethylene(ethylene-4-methylpentene-1 copolymer) with a melt index of 0.8 g/10 min., a density of 0.906 g/cm$^3$ at 25° C. and a 4-methylpentene-1 content of 5% by mole was melted and kneaded to prepare a polymer mixture. The DSC curve of this mixture showed that the main peak temperature was 122° C. and the endothermic area under 112° C. was 63.1% of the total endothermic area. In the same manner as Example 1, this polymer mixture was used to prepare an unstretched film which was then tubular-stretched 3 times in both machine and transverse directions and annealed at 75° C. to give a collapsed heat shrinkable film.

The resulting film had a thickness of 20.4 μm, a thickness variation of 8.5 %, heat shrinkages of 16.1% and 16.8% in machine and transverse directions, respectively, at 85° C., and an area heat shrinkage of 30.2% at 85° C.

A loaf of raw beef, weighing about 2 kg, was prepackaged with the above film and passed through a commercially available tunnel heater for shrinking in which a hot air stream at 90° C. was available for 10 seconds, whereupon the meat loaf was tightly packaged. The meat loaf itself showed no change.

Various physical values inclusive of the above-mentioned shrinkage data are given in Table 1.

EXAMPLE 3

A mixture of 40 parts by weight of the same linear low density polyethylene(ethylene-4-methylpentene-1 copolymer) as used in Example 1, 40 parts by weight of the linear low density polyethylene(ethylene-butene-1 copolymer) as used in Example 1 and 20 parts by weight of an ultra-low density polyethylene(ethylene-butene-1 copolymer) with a melt index of 3.6 g/10 min., a density of 0.88 g/cm$^3$ at 25° C. and a butene-1 content of 15% by mole was melted and kneaded to give a polymer mixture. In the same manner as Example 1, this polymer mixture was extruded to prepare an unstretched film which was then tubular-stretched 3 times in each of the machine and transverse directions and annealed at 70° C. to give a collapsed heat shrinkable film.

The DSC curve of the above polymer mixture showed that the main peak temperature was 122° C. and the endothermic area under 112° C. accounted for 60.5% of the total endothermic area.

The resulting film had a thickness of 20.3 μm, a thickness variation of 9%, and heat shrinkages of 18.2% and 18.9% in machine and transverse directions, respectively, at 85° C., and an area heat shrinkage of 32.4% at 85° C.

Polystyrene bottles containing a Lactobacillus fermentation beverage, each measuring 75 mm in height and 40 mm in maximum diameter, were pre-packaged with the above film, 5 bottles per batch, and passed through a shrink tunnel heater at 100° C. for 3 seconds.

Despite this short shrinking treatment time, tight-fit packaging results could be obtained.

Various physical data inclusive of the above-mentioned shrinkage data are given in Table 1.

EXAMPLE 4

The same procedures as in Example 1 except that a mixture of 70 parts by weight of a linear low density polyethylene(ethylene-octene-1 copolymer) with a melt index of 1.0 g/10 min., a density of 0.920 g/cm$^3$ at 25° C. and an octene-1 content of 3% by mole and 30 parts by weight of the same ultra-low density polyethylene as used in Example 2 was used were repeated to give a heat shrinkable film.

The DSC curve of the polymer mixture used showed that the main paek temperature was 121° C. and the endothermic area under 111° C. accounted for 62.5% of the total endothermic area.

The thus obtained film had a thickness of 17.8 μm, a thickness variation of 14.5%, heat shrinkages of 15.8% and 16.1% in machine and transverse directions, respectively, at 85° C., and an area heat shrinkage of 29.4% at 85° C.

About 2 kg of dressed raw beef was prepackaged with the above film and passed through a commercially available shrink tunnel heater in which a hot air stream at 90° C. was available for 10 seconds. Just as in Example 2, the film was tightly shrunken on the beef. The surface of the beef also showed no apparent signs of change.

Various physical data inclusive of the above-mentioned shrinkage data are given in Table 1.

EXAMPLE 5

To a mixture of 85 parts by weight of the same ultra-low density polyethylene as used in Example 2 and 15 parts by weight of the same ultra-low density polyethylene as used in Example 3 were added 3,500 ppm of a silica type antiblocking agent (available under the commercial name "Radiolite F", Showa Kagaku Kabushiki Kaisha) and 1,200 ppm of erucic amide. In the same manner as Example 1, the above polymer mixture was extruded to prepare an unstretched film which was then tubular-stretched 3 times in each of machine and transverse directions and further annealed at 75° C. After cooling, the tubular film was collapsed and taken up.

The DSC curve of the above polymer mixture showed that the main peak temperature was 123° C. and the endothermic area under 113° C. accounted for 61.3% of the total endothermic area.

The resulting film had a thickness of 21.2 $\mu$m, heat shrinkages of 18.1% and 18.6% in machine and transverse directions, respectively, at 85° C., and an area heat shrinkage of 33.3% at 85° C.

Raw broiler meat was shrink-packaged with the above film in the same manner as Example 1. The film was tightly fitted over the meat and the broiler meat also showed no apparent change.

Various physical data inclusive of the above shrinkage data are given in Table 1.

EXAMPLE 6

An ethylene-butene-1 copolymer with a density of 0.922 g/cm$^3$ at 25° C., a melt index of 0.8 g/10 min. and a butene-1 content of 5% by mole was melted and kneaded at 170° to 230° C. and extruded from a circular die kept at 230° C. The DSC curve of the above polymer showed that the main peak temperature was 126° C. and the endothermic area under 116° C. accounted for 63.8% of the total endothermic area. The extruded film was cooled as it was guided over the outer surface of a cylindrical mandrel internally supplied with circulating cooling water, with the external side being passed through a water bath, to give a tubular unstretched film with a diameter of about 66 mm and a thickness of 250 $\mu$m. This unstretched film as the material film was fed to the biaxial stretching apparatus shown in FIG. 2 where it was stretched 4 times in both machine and transverse directions at 95° to 105° C. The stretched film was annealed with a tubular annealing apparatus using a hot air stream of 75° C. for 10 seconds and, then, cooled to room temperature. The cooled film was collapsed and taken up.

The stability of the tube during stretching operation was satisfactory without a vertical dislocation of the stretching point or a swing of the tube, nor was observed an uneven stretching result such as necking. The stretched film had a thickness of 16 $\mu$m, an area heat shrinkage of 31.5% at 90° C. and a thickness variation of 15%.

Pizza pies, 15 cm in diameter and about 1 cm in thickness, were pre-packaged with the above film and passed through a shrink tunnel heater with a hot air blast of 110° C. for about 3 seconds. As a result, tightly-fitted packages were obtained, and the pies showed no change.

EXAMPLE 7

An ethylene-octene-1 copolymer with a density of 0.917 g/cm$^3$ at 25° C., a melt index of 2.3 g/10 min. and an octene-1 content of 3.5% by mole was extruded and stretched in the same manner as in Example 6 except that the stretching temperature was set at 90° to 100° C. The DSC curve of the above copolymer showed that the main peak temperature was 121° C. and the endothermic area under 111° C. accounted for 57% of the total endothermic area.

The stability of the tube during stretching operation was satisfactory without a vertical displacement of the stretching point or a swing of the tube, nor was observed an uneven stretching result.

The resulting stretched film had an average thickness of 16 $\mu$m, a thickness variation of 8% and an area heat shrinkage of 27% at 90° C.

Polystyrene bottles containing a Lactobacillus fermentation beverage, each measuring 75 mm in height and 40 mm in maximum diameter, were pre-packaged with the above film, 5 bottles per batch, and passed through a hot-wind shrink tunnel heater at 100° C. for 3 seconds.

Despite the short shrinking treatment time, a satisfactory shrink-wrapped product was obtained.

EXAMPLE 8

A mixture of 70 parts by weight of an ethylene-4-methylpentene-1 copolymer with a density of 0.925 g/cm$^3$ at 25° C., a melt index of 1.0 g/10 min. and a 4-methylpentene-1 content of 3% by mole and 30 parts by weight of an ethylene-butene-1 copolymer with a density of 0.923 g/cm$^3$ at 25° C., a melt index of 0.8 g/10 min. and a butene-1 content of 5% by mole was melted and kneaded at 170° to 230° C. and extruded from a circular die maintained at 230° C. The DSC curve of the above copolymer mixture showed that the main peak temperature was 124° C. and the endothermic area under 114° C. accounted for 58.8% of the total endothermic area. The extruded film was guided and taken up as it was cooled over the outer surface of a cylindrical mandrel internally supplied with circulating cooling water, with the external side of the film being passed through a water bath, to thereby produce a tubular unstretched film with a diameter of about 66 mm and a thickness of 320 $\mu$m. This unstretched film was guided to a biaxial stretching apparatus, where it was stretched at 95° to 105° C. 4.3 times in the machine direction and 3.8 times in the transverse direction. The film was then annealed at 75° C. for 10 seconds and taken up in collapsed form.

The stability of the film during stretching operation was satisfactory without a vertical displacement of the stretching point or a swing of the tube, nor was observed an uneven stretching result such as necking, vertical cracking, etc.

The resulting film had an average thickness of 20 $\mu$m, a thickness variation of 10%, and an area heat shrinkage of 25.8% at 90° C. Shrink-packaging was carried out with this film in the same manner as Example 6. As a result, tightly-fitted packages were obtained and no change was found in the packaged product.

COMPARATIVE EXAMPLE 1

An ethylene-butene-1 copolymer with a density of 0.918 g/cm$^3$ at 25° C., a melt index of 1.0 g/10 min. and a butene-1 content of 3.5% by mole was extruded, stretched and annealed in otherwise the same manner as in Example 6. The DSC curve of the copolymer showed that the main peak temperature was 120° C. and the endothermic area under 110° C. accounted for 49% of the total endothermic area.

At the stretching temperature (95° to 105° C.) used, the tube showed swinging and the necking phenomenon. When the stretching temperature was lowered in order to improve the stability of the tube, the necking became more pronounced to cause an increased uneveness. When the stretching temperature was increased to a range of 103° to 108° in order to suppress the necking phenomenon, the vertical displacement and swing of the tube were amplified to interfere with stretching stability.

The stretched film obtained at the stretching temperature of 103° to 108° C. had an average thickness of 16 μm, a thickness variation of 27%, and an area heat shrinkage of 15.4% at 90° C.

This film was poor in flatness and not suitable for continuous packaging with an automatic packaging machine. Moreover, when the film was subjected to the same shrinking treatment as in Example 6, it failed to give a satisfactory package, showing many creases and raised areas. Although the packaged condition could be improved by increasing the tunnel temperature or the residence time in the tunnel, the product packaged underwent partial melting and deformation so that its market value was drastically reduced.

COMPARATIVE EXAMPLE 2

A mixture of 60 parts by weight of an ethylene-hexene-1 copolymer with a density of 0.921 g/cm³ at 25° C., a melt index of 0.75 g/10 min. and a hexene-1 content of 4% by mole and 40 parts by weight of an ethylene-octene-1 copolymer with a density of 0.920 g/cm³ at 25° C., a melt index of 1.0 g/10 min. and an octene-1 content of 3% by mole was extruded, stretched and annealed under the same conditions as in Example 8. The DSC curve of the copolymer mixture used showed that the main peak temperature was 127° C. and the endothermic area under 117° C. accounted for 50.4% of the total endothermic area.

The necking phenomenon in the stretched area was remarkable. When the stretching temperature was increased to a range of 105° to 112° C. in order to suppress the necking phenomenon, the tube showed marked swinging so that no stable stretching result could be obtained.

The stretched film obtained at the stretching temperature of 105° to 112° C. had an average thickness of 16 μm, a thickness variation of 23%, and an area heat shrinkage value of 16.4% at 90° C.

TABLE 1

|  |  | Ex. 1 | Ex. 2 | Ex. 3 | Ex. 4 | Ex. 5 | Ex. 6 | Ex. 7 | Ex. 8 | Com. Ex. 1 | Com. Ex. 2 |
|---|---|---|---|---|---|---|---|---|---|---|---|
| Thickness (μm) |  | 20.8 | 20.4 | 20.3 | 17.8 | 21.2 | 16 | 16 | 20 | 16 | 16 |
| Thickness variation (%) |  | 12.0 | 8.5 | 9 | 14.5 | 10.5 | 15 | 8 | 10 | 27 | 23 |
| Haze (%) |  | 3.4 | 3.8 | 2.7 | 2.8 | 5.0 | — | — | — | — | — |
| Strength at break (kg/cm²) | MD | 775 | 849 | 710 | 840 | 710 | — | — | — | — | — |
|  | TD | 635 | 638 | 600 | 640 | 540 | — | — | — | — | — |
| Elongation at break (%) | MD | 220 | 208 | 210 | 230 | 240 | — | — | — | — | — |
|  | TD | 290 | 317 | 305 | 320 | 330 | — | — | — | — | — |
| Heat shrinkage at 85° C. (%) | MD | 16.7 | 16.1 | 18.2 | 15.8 | 18.1 | — | — | — | — | — |
|  | TD | 18.0 | 16.8 | 18.9 | 16.1 | 18.6 | — | — | — | — | — |
|  | Area | 31.7 | 30.2 | 32.4 | 29.4 | 33.3 | — | — | — | — | — |
| Heat shrinkage at 95° C. (%) | MD | 20.1 | 19.8 | 20.3 | 18.7 | 20.2 | 16.0 | 12.5 | 12.2 | 7.8 | 8.3 |
|  | TD | 22.7 | 22.2 | 23.0 | 21.7 | 23.0 | 18.4 | 16.6 | 15.5 | 8.2 | 8.8 |
|  | Area | 39.2 | 37.6 | 38.6 | 36.3 | 38.6 | 31.5 | 27.0 | 25.8 | 15.4 | 16.4 |
| Seal strength (g/15 mm width) | 160° C. | 1,300 | 1,330 | 1,020 | 1,500 | 970 | — | — | — | — | — |
|  | 200° C. | 1,510 | 1,530 | 1,230 | 1,500 | 1,290 | — | — | — | — | — |
| Melting temperature of polymer (main endothermic peak) (°C.) |  | 120 | 122 | 122 | 121 | 123 | 126 | 121 | 124 | 120 | 127 |
| Endothermic area ratio (%) (Note) |  | 60.7 | 63.1 | 60.5 | 62.5 | 61.3 | 63.8 | 57 | 58.8 | 49 | 50.4 |

(Note) $\dfrac{\text{Endothermic area } S_2}{\text{Total endothermic area } S_1} \times 100$ In addition to the ingredients used in the Examples, other ingredients can be used in the Examples as set forth in the specification to obtain substantially the same results.

What we claim is:

1. A heat shrinkable ethylene polymer film having a heat shrinkage of at least 15% at 85° C. in each of machine and transverse directions and a thickness variation of not more than 20%, said heat shrinkable ethylene polymer film being a biaxially stretched film of a polymer mixture in a stretching ratio of at least 2 in each of machine and transverse directions, said polymer mixture comprising (A) 90 to 50% by weight of at least one linear copolymer of ethylene and α-olefin having a density of 0.90 to 0.93 g/cm³ at 25° C. and a melt index of 0.2 to 3.0 g/10 min. and (B) 10 to 50% by weight of at least one ethylene-α-olefin copolymer having a density of 0.87 to 0.91 g/cm³ and less than the density of the copolymer (A) by at least 0.014 g/cm³ and a melt index of 0.2 to 5.0 g/10 min, said polymer mixture indicating a differential scanning calorimetry (DSC) curve wherein an endothermic area below the temperature lower than the melting temperature (main endothermic peak temperature) of the polymer mixture by 10° C. accounts for at least 55% of the total endothermic area.

2. The heat shrinkable ethylene polymer film of claim 1, wherein said α-olefin in the copolymer (A) is at least one member selected from the group consisting of butene-1, pentene-1, hexene-1, octene-1 and 4-methylpentene-1.

3. The heat shrinkable ethylene polymer film of claim 1, wherein said ethylene-α-olefin copolymer (B) is a copolymer of ethylene and 5 to 20% by mole of α-olefin.

* * * * *